(12) United States Patent
Ajiki et al.

(10) Patent No.: US 7,686,489 B2
(45) Date of Patent: Mar. 30, 2010

(54) LIGHT SOURCE DEVICE AND VEHICLE LIGHTING DEVICE

(75) Inventors: Shuichi Ajiki, Tokyo (JP); Koichi Masuyama, Tokyo (JP); Naoya Sone, Tokyo (JP); Sadayuki Konishi, Tokyo (JP); Yasuo Toko, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 140 days.

(21) Appl. No.: 11/950,980

(22) Filed: Dec. 5, 2007

(65) Prior Publication Data

US 2008/0273351 A1 Nov. 6, 2008

(30) Foreign Application Priority Data

Dec. 5, 2006 (JP) ............................. 2006-328147

(51) Int. Cl.
*F21V 8/00* (2006.01)
(52) U.S. Cl. ........................ 362/511; 362/628
(58) Field of Classification Search ................. 362/511, 362/628, 621
See application file for complete search history.

(56) References Cited

U.S. PATENT DOCUMENTS

| | | | |
|---|---|---|---|
| 5,477,422 A | 12/1995 | Hooker et al. | |
| 6,275,339 B1 | 8/2001 | Chazallet et al. | |
| 6,601,982 B1 | 8/2003 | Begemann et al. | |
| 7,001,054 B2 * | 2/2006 | Koizumi et al. | 362/545 |
| 7,073,931 B2 * | 7/2006 | Ishida | 362/539 |
| 2001/0019486 A1 | 9/2001 | Thominet | |
| 2005/0268839 A1 * | 12/2005 | Araki et al. | 116/288 |
| 2006/0007702 A1 * | 1/2006 | Hsieh et al. | 362/611 |
| 2006/0022211 A1 | 2/2006 | Yatsuda et al. | |
| 2007/0008736 A1 * | 1/2007 | Gasquet | 362/511 |

FOREIGN PATENT DOCUMENTS

EP 0532262 3/1993

(Continued)

OTHER PUBLICATIONS

Search Report for European Patent App. No. 07023593.2 (Mar. 25, 2008).

*Primary Examiner*—Laura Tso
(74) *Attorney, Agent, or Firm*—Cermak Kenealy Vaidya & Nakajima LLP

(57) ABSTRACT

An LED light source device and an illumination device using the same, including vehicle lighting devices, can have a light weight and thin profile and can form a desired light distribution pattern while employing a simple configuration. The light source device can include a plate shaped light guide member made of a material that is transparent in a visible range. The light guide member can have a front surface serving as a light emitting surface and having a plate shape, and a rear surface having a luminance control element for controlling a luminance distribution on the light emitting surface. A point or linear light source facing towards an end surface of the light guide member can be provided. The luminance control element controls light reaching the element from the end surface of the light guide member and configures the luminance distribution on the light emitting surface, the luminance distribution being obtained by reducing a light distribution pattern to be projected (and in some cases horizontally and vertically reversing the pattern).

24 Claims, 10 Drawing Sheets

FOREIGN PATENT DOCUMENTS

| | | |
|---|---|---|
| EP | 0838628 | 4/1998 |
| EP | 1487025 | 12/2004 |
| EP | 1515368 | 3/2005 |
| JP | 06300922 | 10/1994 |
| JP | 2001076510 | 3/2001 |
| JP | 2004247072 | 9/2002 |
| JP | 2003503815 | 1/2003 |
| JP | 2003329977 | 11/2003 |
| JP | 2006048934 | 2/2006 |
| WO | WO01/01037 | 1/2001 |
| WO | WO02/066893 | 8/2002 |

* cited by examiner

LIGHT SOURCE DEVICE AND VEHICLE LIGHTING DEVICE

This application claims the priority benefit under 35 U.S.C. §119 of Japanese Patent Application No. 2006-328147 filed on Dec. 5, 2006, which is hereby incorporated in its entirety by reference.

BACKGROUND

1. Technical Field

The presently disclosed subject matter relates to a light source device which uses a plurality of LED devices or the like as a light source. The presently disclosed subject matter also relates to a vehicle lighting device utilizing the light source device, such as a headlight, an auxiliary headlight, tail-light, fog light, signal light, or the like.

2. Related Art

A conventional light source device utilizing an LED device has been known for use in a vehicle headlight, an LED lamp for use as a light source, and the like.

An example of a conventional vehicle headlight is disclosed in Japanese Translation of PCT Application No. 2003-503815 (corresponding to PCT Publication No. WO 01/001037) as shown in FIG. 1. The vehicle headlight of this type includes a light source which is composed of a plurality of light emitting diodes 1 arranged side by side, and an optical member (not shown) such as a lens located in front of the light source.

In this configuration, the light emitted from the respective light emitting diodes 1 passes through the optical member, such as a lens, located in front of the light source. The light, to which a light distribution property has been imparted by the optical member, is then externally emitted. This can provide a desired light distribution property for the vehicle headlight.

FIG. 2A shows another lighting device including an LED lamp as disclosed in Japanese Patent Application Laid-Open No. 2006-048934 (corresponding to U.S. Patent Publication No. 2006/022211A1). The lighting device utilizes an LED lamp 2 composed of a plurality of LEDs 2b (refer to FIG. 2B) and a concave reflector 3 having a focus near the light emitting area of the LED lamp 2. The plurality of LEDs 2b are arranged on the substrate 2a so as to provide an illumination pattern similar to that of a filament type light source.

By this structure, the light emitted from the LED lamp 2 is reflected by the reflector 3 and projected toward the illumination direction (forward direction). Accordingly, the image of the light emitting portion of the LED lamp 2 is projected forward to provide desired light distribution characteristics.

FIG. 3 shows another type of headlight disclosed in Japanese Patent Application Laid-Open No. 2001-076510. In contrast to the headlight and the lighting device described above utilizing LED devices, this headlight is configured to be a typical projector type headlight 4, which is composed of a bulb 5 as a light source, a reflector 6, a projection lens 7, and a light-shielding member 8.

The reflector 6 is composed of an elliptic reflecting surface having a first focus (a rear-side focus) near the bulb 5 and a major axis extending horizontally toward the front illumination direction, and an inner surface that serves as a reflecting surface.

The projection lens 7 is composed of a convex lens or an aspherical lens having a rear-side focus, and is disposed so that the rear-side focus is located near the second focus of the reflector 6.

The light-shielding member 8 is arranged near the second focus of the reflector 6 so as to provide the light projected toward the front illumination direction with a desired low-beam light distribution pattern. The light-shielding member 8 has an upper edge 8a with a predetermined shape in order to form a cut-off line in the light distribution pattern.

Light emitted from the bulb 5 of the headlight 4 configured as described above is directly incident on the projection lens 7 to be projected in the front illumination direction. Alternatively, the light is reflected by the reflector 6 to be focused near the second focus of the reflector 6 and the virtual image formed near the focus is reversed by the projection lens 7 to be projected in the front illumination direction.

Part of the virtual image is shielded by the light shielding member 8 so that the cut-off line C is formed by the upper edge 8a of the light shielding member 8 (see FIG. 4). The shaped virtual image is projected forward as a low beam.

FIG. 4 shows the virtual image, and this image is horizontally and vertically reversed by the projection lens. This can provide a light distribution pattern for right-side traffic. The pattern is designed not to include part of a left side area from the center of the luminance distribution by the cut-off line C in order to prevent any glare of light towards an opposite traveling vehicle.

As described above, typical vehicle headlights should provide light distribution patterns including a low-beam pattern (passing-by pattern), a high-beam pattern (traveling pattern), and the like. In the description, the light distribution pattern having a cut-off-line C is defined as a cut-off pattern.

The vehicle headlight disclosed in Japanese Translation of PCT application No. 2003-503815 (corresponding to PCT publication No. WO 01/001037) includes a plurality of light emitting diodes 1 arranged side by side in order to provide a desired or required light intensity—enough for a lighting device.

However, a desired light distribution pattern may not be obtained only by the light source in which the light emitting diodes are arranged side by side. In order to provide a desired light distribution pattern, the vehicle headlight can have an optical member for controlling the light distribution pattern arranged in front of the light source.

Further, this vehicle headlight is configured to improve the visibility around the vehicle. Accordingly, the vehicle headlight disclosed in this PCT publication is not designed for the purpose of ensuring the driver's field of view by projecting light in the front illumination direction.

The lighting device including an LED lamp disclosed in Japanese Patent Application Laid-Open No. 2006-048934 uses a single package incorporating a plurality of LED chips in order to obtain a desired or required light intensity—enough for a lighting device.

In this LED lamp including a plurality of LED chips, the light emitting portion is formed in a shape similar to the shape of a filament and utilizes a particular reflecting surface used in a conventional projector type headlight, thereby obtaining a desired light distribution pattern.

In doing so, the particular reflector located in back of the light source, and in some cases a light shielding member located in front of the light source, should be provided in order to obtain a desired light distribution pattern.

In this instance, however, it is difficult to obtain a desired or required light distribution pattern using only a single LED lamp. In order to cope with this problem, the headlight adopts a double-lamp system utilizing a plurality of LED lamps. In this case, however, the entire size of the lighting device is enlarged. Furthermore, since the headlight should have a reflector, the entire weight of the lighting device is increased. This weight increase is not preferable for achieving the Adaptive Front-Lighting System (AFS) which is recently popular. This is because a large load is unfavorably applied to the drive mechanism in an AFS device.

Furthermore, since a plurality of LED chips are arranged within the lamp housing of the LED lamp, individual light emitting points of the LED chips can be recognized under some conditions. As a result, the luminance distribution of the headlight may finely vary, whereby an appearance of the headlight may deteriorate.

The headlight disclosed in Japanese Patent Application Laid-Open No. 2001-076510 also calls for a reflector, and in some cases, a light-shielding member inside the lighting device. Accordingly, the entire weight and size of the lighting device is increased and the depth thereof may be approximately 130 mm.

Furthermore, the reflector for use in this headlight should be designed so as to correspond to the shape of the light emitting portion of the bulb serving as a light source. The planning and designing of such a reflector may take relatively longer time.

SUMMARY

In view of the foregoing characteristics, features, and problems associated with the conventional lighting devices, an aspect of the presently disclosed subject matter is to provide an LED light source device, an illumination device, and a vehicle headlight utilizing the LED light source device. In particular, according to an aspect of the disclosed subject matter, the LED light source device can have a light weight and thin profile and can form a desired light distribution pattern with a simple configuration.

According to another aspect of the presently disclosed subject matter, a light source device can include a plate shape light guide member made of a material that is transparent in a visible range, the light guide member having a front surface serving as a light emitting surface with a platy shape and a rear surface having a luminance control element for controlling a luminance distribution on the light emitting surface, and a point or linear light source facing towards an end surface of the light guide member, wherein the luminance control element controls light reaching the element from the end surface of the light guide member and configures the luminance distribution on the light emitting surface, the luminance distribution being obtained by reducing a light distribution pattern to be projected (and in some cases horizontally and vertically reversing the pattern).

In accordance with another aspect of the presently disclosed subject matter, the luminance control element may include a dotted or groove-shaped fine structure.

In accordance with another aspect of the presently disclosed subject matter, the luminance control element may be formed by coating or printing a dotted pattern or a striped pattern with a high-reflectivity ink or coating.

In accordance with another aspect of the presently disclosed subject matter, the light distribution pattern may include a cut-off area.

In accordance with another aspect of the presently disclosed subject matter, the light emitting surface of the light guide member may have a shape corresponding to the pattern including the cut-off area.

In accordance with another aspect of the presently disclosed subject matter, the pattern including the cut-off area may be arranged near the end surface of the light guide member where the light source is provided.

In accordance with another aspect of the presently disclosed subject matter, an optical fiber may be provided between the light source and the light guide member to guide the light emitted from the light source to the end surface of the light guide member.

According to another aspect of the presently disclosed subject matter, a vehicle lighting device can include a light source device as described above and a convex projection lens for projecting light emitted from the light source device toward a front illumination direction, having a focus on a side of the light source device and near the light emitting surface of the light guide member of the light source device.

In accordance with another aspect of the presently disclosed subject matter, the light guide member may be formed to be curved at both ends toward the lens in order to compensate a spherical aberration of the projection lens.

In accordance with another aspect of the presently disclosed subject matter, the light guide member is formed to have narrowed end portions at both ends of the light emitting surface by narrowing lower sides of the end portions in order to compensate a spherical aberration of the projection lens.

In accordance with another aspect of the presently disclosed subject matter an optical sheet can be located near the light emitting surface of the light guide member, for controlling the light emitted from the light guide member so as to align a maximum luminous direction of the light with an optical axis of the projection lens.

In accordance with another aspect of the presently disclosed subject matter, the light guide member may be arranged obliquely to the optical axis of the projection lens so as to align a maximum luminous direction of the light with the optical axis of the projection lens.

In accordance with another aspect of the presently disclosed subject matter, a portion of the light guide member for forming a cut-off line may be located near the focus of the projection lens on the side of the light source device.

In accordance with another aspect of the presently disclosed subject matter a reflector can be included near the focus of the projection lens on the side of the light source device and on the optical axis of the projection lens, wherein the light source device may be positioned on a line which is obtained by bending the optical axis of the projection lens at the reflector.

In the above configuration, the light emitted from the light sources enters the end surface of the light guide member and is repeatedly reflected within the light guide member to exit from the surface of the light guide member.

In this configuration, the light reaching the rear face of the light guide member is reflected by the luminous control element to thereby be controlled in luminous intensity. Namely, the light exiting from the surface of the light guide member has been adjusted to be provided with a predetermined luminance distribution.

Accordingly, the predetermined luminance distribution formed on the surface of the light guide member is projected to the outside as illumination light having a light distribution pattern corresponding to the luminance distribution.

For example, the light having a predetermined luminance distribution formed on the light guide member is projected with the use of a transparent lens along its optical axis, and therefore, a desired light distribution pattern can be obtained.

In this case, a luminance distribution which is obtained by reducing a light distribution pattern to be projected (and in some cases horizontally and vertically reversing the pattern) is formed on the surface of the light guide member. Accordingly, the lighting device including the present light source device need not have a reflector which is typically included in the conventional lighting devices. This can eliminate the burden of reflector design and weight, thereby facilitating the designing of the lighting device with shorter period of time.

Furthermore, in accordance with the presently disclosed subject matter, the desired light distribution pattern can be adjusted easily by the luminance control element provided on the rear surface of the light guide member. Accordingly, a lighting device such as a vehicle headlight can be configured to have a desired luminance distribution with ease. For example, if a luminance distribution that can be continuously varied is desired or required, a lighting device such as a vehicle headlight can be configured to emit light which has a continuously varying luminance distribution.

This eliminates a plurality of lighting devices arranged side by side in order to obtain a desired continuously varying luminance distribution. Accordingly, the lighting device such as a vehicle headlight can be small in size with reduced costs.

When the luminance control element is configured to include a dotted or groove-shaped fine structure, or alternatively is formed by coating or printing a dotted pattern or a striped pattern with a high-reflectivity ink or coating, a desired luminance distribution can be adjusted by the design of the fine structure, the shape, size and distribution density of the pattern formed by the high-reflectivity ink or coating.

When the light distribution pattern includes a cut-off area, the light emitting surface of the light guide member can have a shape corresponding to the pattern including the cut-off area. Thus, the light source device can form a pattern including the cut-off area. In this way, there is no need to provide a light shielding member or the like for forming a pattern including such a cut-off area, thereby simplifying the structure of the lighting device to achieve lower manufacturing costs.

When the end surface of the light guide member where the light source is provided is arranged near the cut-off area, since the boundary line between the light area and dark area by the cut-off line is located near the light source, a high luminous intensity at that point can be easily obtained. Accordingly, a favorable light distribution pattern can be obtained.

When an optical fiber is provided between the light source and the light guide member to guide the light emitted from the light source to the end surface of the light guide member, the light emitted from each light source can be accurately guided to a predetermined position of the light guide member. This arrangement can allow the light sources to be positioned away from the light guide member. Accordingly, the light sources located away from the light guide member can efficiently dissipate the generated heat at this location.

In another configuration, the light emitted from the respective light sources enters the end surface of the light guide member and is repeatedly reflected within the light guide member to exit from the surface of the light guide member. The light reaching the rear face of the light guide member is reflected by the luminous control element to thereby be controlled in luminous intensity. Namely, the light exiting from the surface of the light guide member has been adjusted to be provided with a predetermined luminance distribution. In this instance, the projection lens can project the light with the luminance distribution in the front illumination direction, by enlarging and horizontally and vertically reversing the luminance distribution to form a desired light distribution pattern.

In this case, a luminance distribution corresponding to the desired light distribution pattern is formed on the light emitting surface of the light guide member of the light source device. Accordingly, the lighting device including the light source device need not have a reflector which is typically present in conventional vehicle headlights, and can have a small size with light weight and reduced costs, among other features. This facilitates the configuration of a headlight incorporating the AFS function.

When the light emitting surface of the light guide member has a shape corresponding to the pattern including the cut-off area, there is no need to provide a light shielding member or the like for forming a pattern including such a cut-off area as in the conventional manner, thereby simplifying the structure of the lighting device and resulting in lower manufacturing costs.

When the light guide plate is formed to be curved at both ends toward the lens in order to compensate for a spherical aberration of the projection lens, any effect due to the spherical aberration can be reduced.

Furthermore, since such spherical aberration is less than before, even when there was little effect due to spherical aberration of the projection lens, the lighting device can employ a projection lens having a relatively large spherical aberration with moderate cost.

When an optical sheet located near the light emitting surface of the light guide member is configured to control the light emitted from the light guide member, and is provided so as to align a maximum luminous direction of the light with an optical axis of the projection lens, a maximum intensity direction of light reflected from the luminance control element can be aligned with the optical axis of the projection lens. Likewise, when the light guide member is arranged such that a width, thickness, or length of the light guide member is angled obliquely with respect to the optical axis of the projection lens, the maximum luminous direction of the light is aligned with the optical axis of the projection lens, and a maximum intensity direction of light reflected from the luminance control element can be aligned with the optical axis of the projection lens. This means the luminous intensity of projected light can be increased as much as possible.

When the light guide member is obliquely provided with respect to the optical axis of the lens, a relatively large light guide member can be employed because of the reduced size in the oblique direction. Accordingly, the resolution of the luminance control element can be relatively reduced.

When a portion of the light guide member for forming a cut-off line is located near the focus of the projection lens on the side of the light source device, the cut-off line in the light distribution pattern can be formed with high contrast.

Another example of the disclosed subject matter includes a lighting device provided with a reflector near the focus of the projection lens on the side of the light source device and on the optical axis of the projection lens. The light source device can be positioned on a line which is obtained by bending the optical axis of the projection lens at the reflector, i.e. the light source device can be spaced from the optical axis of the lens. In this case, even when a disturbance light such as sunlight enters the projection lens and also enters the light guide member, it is not focused on the light guide member. This prevents the light guide member from being damaged due to heat or chemical break down.

In accordance with the presently disclosed subject matter, a desired light distribution pattern can be formed with a simple configuration. Furthermore, certain embodiments of the presently disclosed subject matter can provide an LED light source device with thin and light-weight structure as well as an illumination device and a lighting device, such as a vehicle headlight, using the LED light source device.

BRIEF DESCRIPTION OF THE DRAWINGS

These and other characteristics, features, and advantages of the presently disclosed subject matter will become clear from the following description with reference to the accompanying drawings, wherein.

DETAILED DESCRIPTION OF EXEMPLARY EMBODIMENTS

Hereinafter, a description will be given of several exemplary embodiments with reference to FIG. 5 through FIG. 14.

First Exemplary Embodiment

Figure 5:
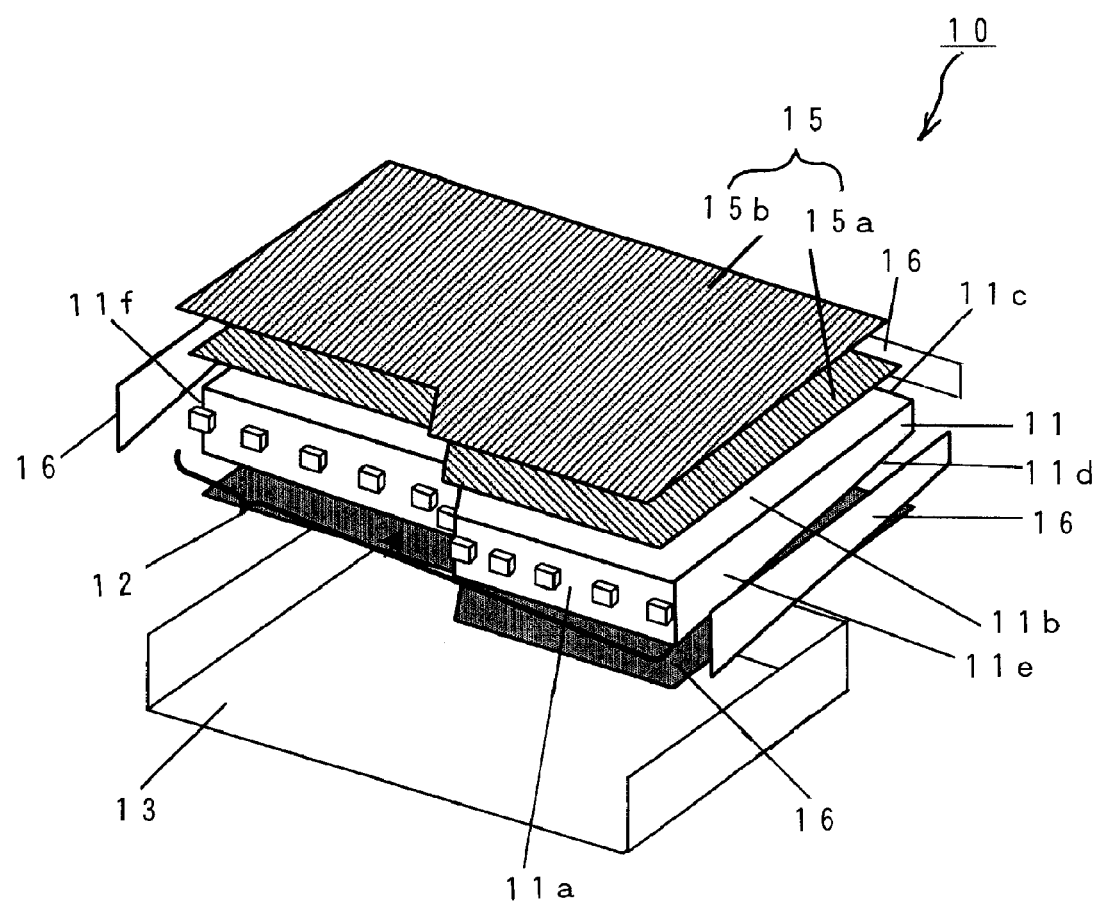
FIG. 5 is a schematic perspective view showing the configuration of a first exemplary embodiment of a light source device for a vehicle headlight made in accordance with principles of the presently disclosed subject matter.

FIG. 5 is a diagram illustrating an embodiment of a light source device for use in a vehicle headlight.

As shown in FIG. 5, the light source device 10 is configured to include a light guide plate (light guide member) 11 and a plurality of LEDs 12 serving as a light source.

The light guide plate 11 has a plate shape and is made of a transparent material, or a material that is transparent in a visible range.

Examples of the transparent material may include, but are not limited to, a transparent resin such as polycarbonate, acrylic resin, and the like, a glass material, and typical optical materials.

The light guide plate 11 has an end surface, which is the nearer side face in FIG. 5, being an incident surface 11a and an upper surface which serves as a light emitting surface 11b. Furthermore, the light source device 10 may have a housing 13 which is made of a light shielding material and covers the rear surface (bottom surface) 11d, right and left side surfaces 11e and 11f, and another end surface 11c.

The light guide plate 11 may have a constant thickness or may have a wedge shape such that the thickness of the plate 11 at the incident surface 11a diminishes towards the other end surface 11c.

The incident surface 11a of the light guide plate 11 may be a fine shape composed of prisms or circular arc ridges or alternatively be roughened in order to improve the light incident efficiency.

Furthermore, the light emitting surface 11b of the light guide plate 11 may have a shape composed of prisms or lenticular shape in order to improve the luminous intensity or adjust the light distribution.

Figure 6:
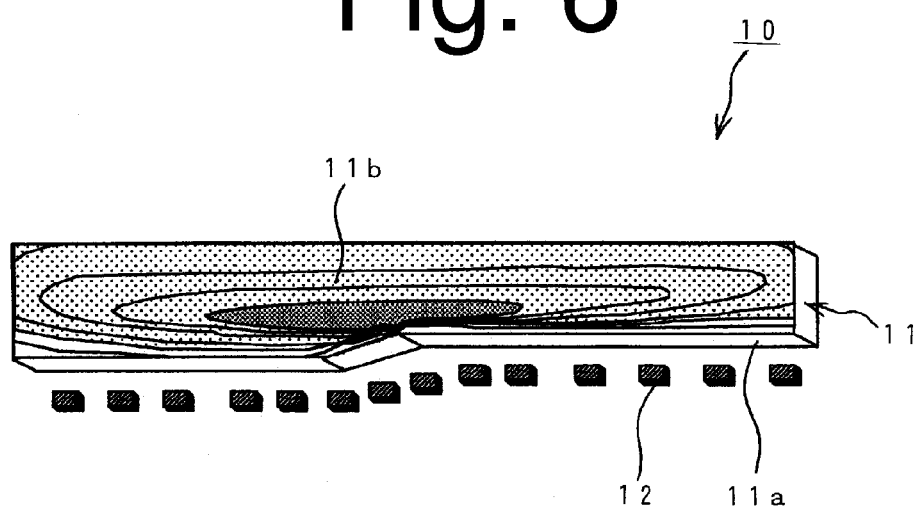
FIG. 6 is a schematic perspective view showing the entire shape of the light guide plate of the light source device of FIG. 5 when viewed from above.

The light guide plate 11 has, as shown in FIG. 6, the light emitting surface 11b shaped in accordance with a desired (or required) light distribution pattern. Specifically, the surface shape is based on the desired light distribution pattern, but reduced and horizontally and vertically reversed. The light distribution pattern may be a low beam pattern with a cut-off line.

Accordingly, the light guide plate 11 in the present embodiment has a step portion at the end surface 11a near its center as shown in FIG. 5 or FIG. 6. Moreover, the width dimension of the guide plate 11 taken from the incident surface 11a to the end surface 11c is substantially the same along a width extending from a side surface to a certain distance from the side surface. At that certain distance, the width gradually tapers to a second width dimension and then remains substantially at that second width dimension to the other opposite side surface of the plate. Thus, a step portion is formed near a center of the end surface 11a.

Figure 7:
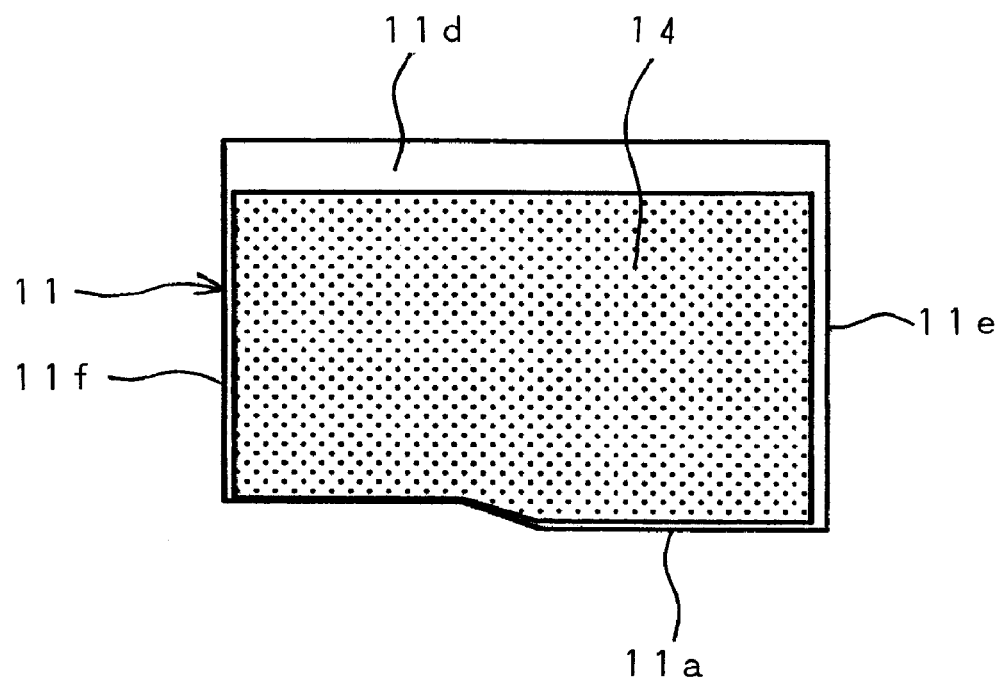
FIG. 7 is a bottom view of the light guide plate including the luminance control element in the light source device of FIG. 5.

Furthermore, as shown in FIG. 7, a luminance control element 14 is provided on the rear surface (bottom surface) 11d of the light guide plate 11 in order to form the predetermined light distribution pattern.

The luminance control element 14 may include a dotted or groove-shaped fine structure, or alternatively, may be formed by coating or printing a dotted pattern or a striped pattern with a high-reflectivity ink or coating.

Part of light entering the light guide plate 11 can reach the luminance control element 14, and when the condition for total reflection does not hold, the light may exit through the light emitting surface 11b opposite to the luminance control element 14.

In this case, the luminance control element 14 is designed to have a predetermined pattern with a particular shape, size, and distribution density. Accordingly, the light exiting from the light emitting surface 11b of the light guide 11 may have a luminance distribution obtained by reducing and vertically and horizontally reversing the desired light distribution pattern to be projected based on the designed pattern of the luminance control element 14.

The light guide plate 11 can be molded from a transparent resin material using a metal mold having a predetermined cavity by injection molding, press molding, extrusion molding or other resin molding techniques. Alternatively, when the light guide plate 11 is formed of a glass material, it can be manufactured using glass molding techniques such as a press molding with a desired metal mold. The resulting light guide plate may be provided with a luminance control element by printing or forming a fine structure thereon.

Such a fine structure is composed of fine concave and convex dots in the shape of a dome, a rectangular frustum, a truncated cone (with a circular or elliptical bottom)), or any shaped frustum, or a combination thereof, etc.

The distance between adjacent fine dots, or the area ratio between the dot bottom area and the surrounding gap between dots, can be appropriately set to adjust the density of the luminance control element. The adjusted density can form the desired luminance distribution formed on the light emitting surface 11b. Namely, a high density area of the luminance control element can form a high luminance area on the light emitting surface 11b whereas a low density area can form a low luminance area.

The fine structure for forming the luminance control element may be a fine shape of prisms or knurl-shape in parallel to each other by extrusion molding a free curved surface with a triangle or elliptic arc cross section on the light emitting surface 11a.

In this case, the ratio between the bottom width of the prism or the knurl-shape and the width of the flat part between them corresponds to the density of the luminance control element.

In the above configuration, the prism or knurl-shape may be convex or concave with respect to the surface of the light guide plate 11 and may have a bottom width of 50 µm or less.

The luminance control element 14 may be formed by printing, such as screen printing or the like, a particular pattern with a high-reflectivity ink on the transparent resin plate. The printed pattern may be composed of a dotted pattern or striped pattern of circles, ellipses, or rectangles. In this case, the density of the printed pattern, or the area ratio between the printed area and the non-printed area, can adjust the luminance distribution on the light emitting surface 11b, and therefore, a high density of the pattern can provide a high intensity area on the light emitting surface 11b and a low density thereof can provide a low intensity area thereon. In this instance, the diameter of each dot or the width of each stripe may be 0.5 mm or less.

In this way, an appropriate density for the luminance control element 14 can provide a desired luminance distribution on the light emitting surface 11b of the light guide plate 11.

The light guide plate 11 may include an optical sheet 15 (or in the illustrated example, a pair of optical sheets 15a and 15b) in order to improve the luminance distribution emitted from the surface or to adjust the light distribution property.

In this instance, the light reflected by the luminance control element 14 may exit by 50 to 70 degrees with respect to the normal of the surface of the light guide plate 11. Accordingly, the optical sheet can correct the exiting direction of the emitted light on the surface of the light guide plate 11 to be normal or substantially normal to the surface 11b of the plate 11. For example, an optical sheet can be employed which has a triangle prism of 50 µm on the lower side thereof.

Examples of such an optical sheet 15a or 15b can include a prism sheet or a diffusion film which are used in typical surface light source devices.

The light guide plate 11 may be used with such a prism sheet. The prism sheet being obtained by imparting a prism shape on a thermoplastic transparent film (originally for use in an optical element) by press molding or extrusion molding. Alternatively, the light guide plate 11 may be used with a prism sheet obtained by imparting a prism shape on a UV curable transparent resin film (originally for use in an optical element) by the 2P method or the like.

The light guide plate 11 may be used with a diffusion film that is manufactured by depositing a sheet of resin or glass beads on an extrusion molded sheet of a thermoplastic transparent resin, where the resin has a different refractive index and is provided on one surface or both surfaces of the guide plate 11. Alternatively, the light guide plate 11 may be used with a diffusion film that is manufactured by extrusion molding a thermoplastic transparent resin mixed with a resin having a different refractive index or with glass beads into a film.

The light guide plate 11 may have a reflective film(s) 16 facing towards the end surface 11c opposite to the light incident surface 11a, opposite the rear surface 11d, and opposite the right and left side surfaces 11e and 11f, in order to improve the utilization efficiency of light emitted from the respective LEDs 12. In this case, the reflective film 16 may be a high-reflective member. Examples thereof can include a high reflectivity metal film obtained by depositing a metal such as aluminum, silver or the like on an extrusion molded resin member by vapor deposition method or sputtering; a resin film or plate obtained by adding a visible light diffusion/reflection agent such as titanium oxide into a resin film made of polycarbonate, for example; and a resin film or plate obtained by fine foam molding; a resin using a supercritical fluid; and/or by foam molding a resin using a chemical foam molding aid.

The housing 13 may serve as a reflective member in place of the reflective film 16, at least in part. In this case, the inside surface of the housing 13 may be directly provided with a high reflectivity metal film by vapor deposition method or sputtering, etc.

In the present exemplary embodiment, the LEDs 12 may be arranged in line so as to face the light incident surface 11a of the light guide plate 11. Furthermore, the LEDs 12 may be arranged at regular intervals along the light incident surface 11a of the light guide plate 11 or at an appropriate interval in order to provide a desired luminance distribution formed on the light emitting surface 11b of the light guide plate 11. It should be appreciated that the LEDs 12 may be arranged in a single line or a plurality of lines.

The light source device in accordance with the presently disclosed subject matter can be driven by an external driving circuit (not shown) to be applied with a predetermined drive voltage, thereby allowing the LEDs 12 to emit light.

The light emitted from the respective LEDs 12 enters the light incident surface 11a of the light guide plate 11. The incident light is repeatedly totally-reflected by the rear surface, and both side surfaces, reaches the end surface and travels backward. In this way, the light is entirely diffused within the light guide plate 11.

Part of light entering the light guide plate 11 reaches the rear surface of the light guide plate 11 and is incident on the luminance control element 14. In this case, the light is not totally reflected, but directed upward to reach the light emitting surface 11b of the light guide plate 11. The other part of light reaches the plane portion (no effect portion) not provided with the element 14, to be totally-reflected.

In this way, the light reaching the surface of the light guide plate 11 has been subjected to luminance control by the luminance control element 14, and therefore, the surface of the light guide plate 11 can have a desired luminance distribution, as shown in FIG. 6.

Figure 1:
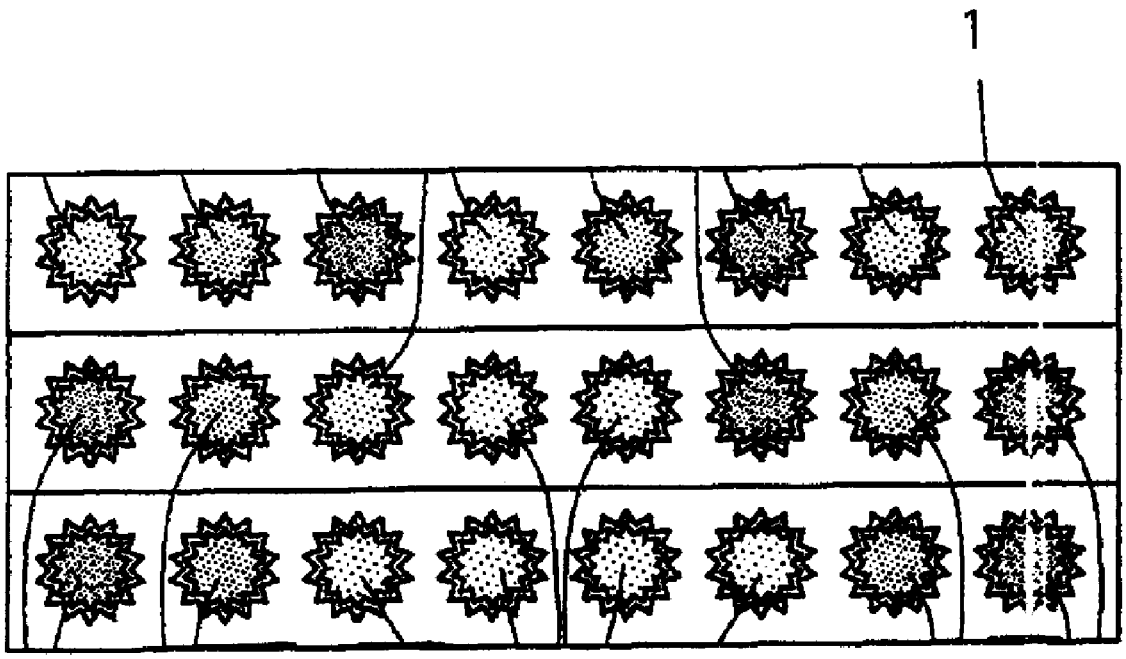
FIG. 1 is a plan view showing a light source for use in a conventional vehicle headlight.
Figure 2A:
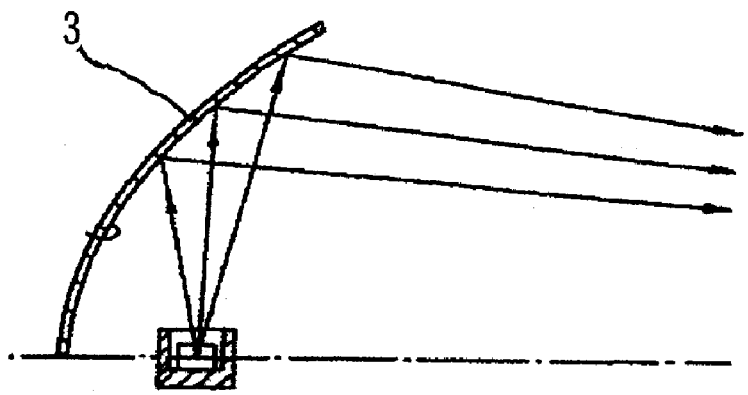
FIGS. 2A and 2B show the configuration of one example of a conventional lighting device including an LED lamp, FIG. 2A being a cross-sectional view of the entire configuration and FIG. 2B being an enlarged cross sectional view of the LED lamp.
Figure 2B:
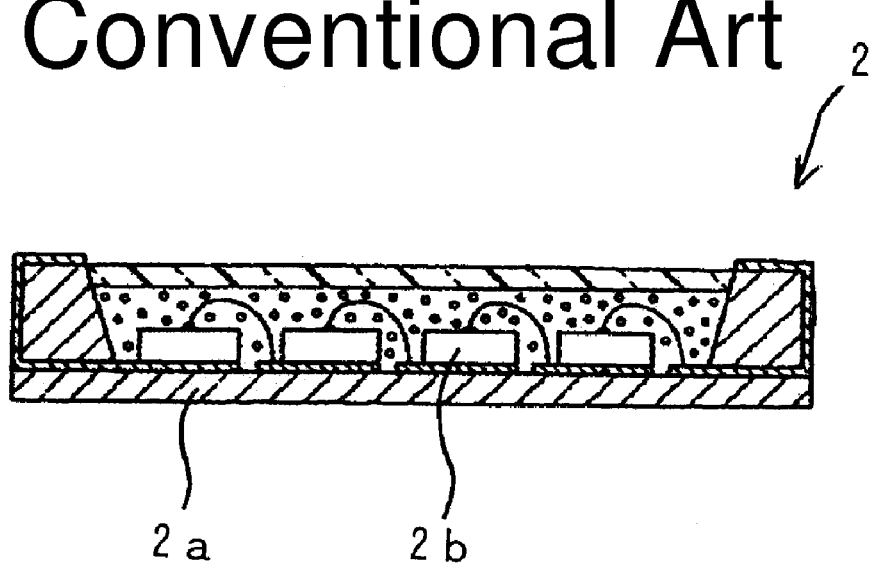
Figure 3:
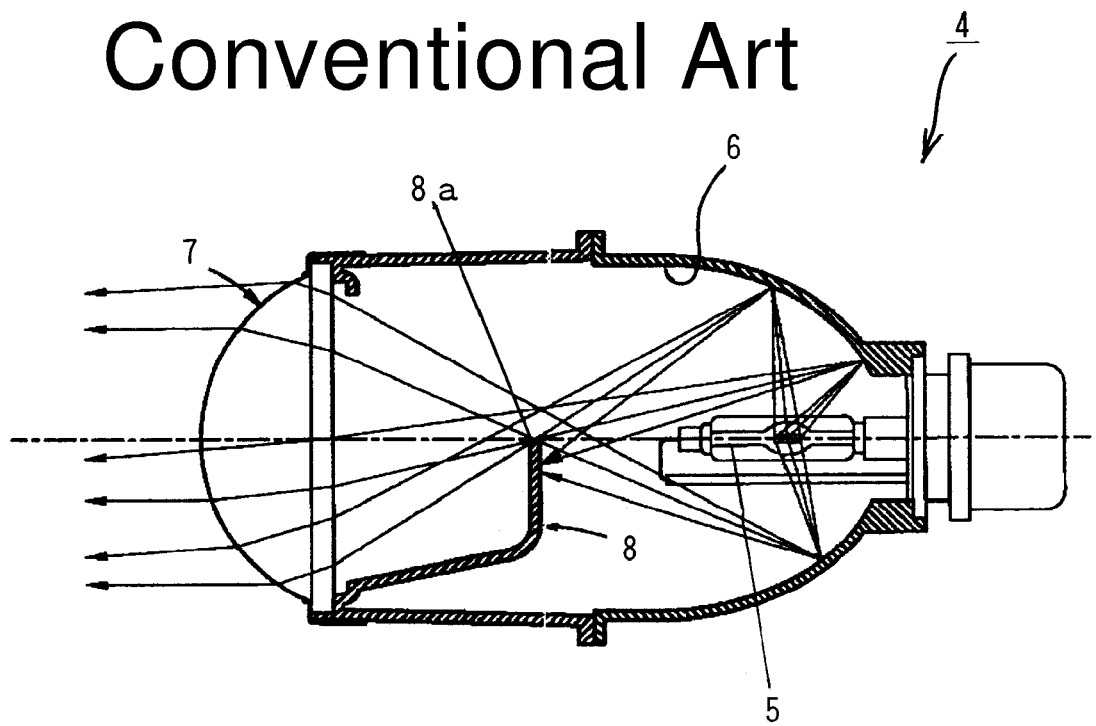
FIG. 3 is a schematic cross sectional view showing one exemplary configuration of a conventional projection type headlight.
Figure 4:
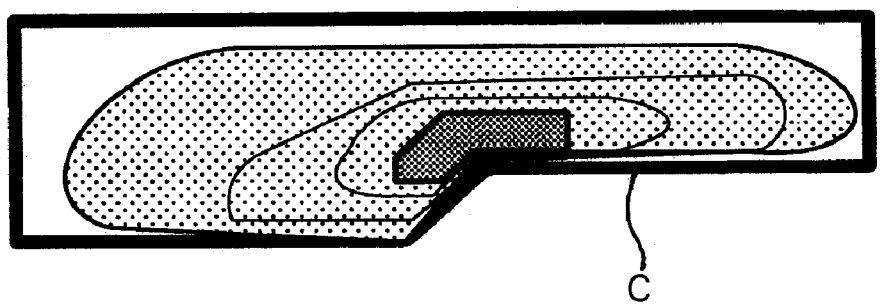
FIG. 4 is a graph showing a virtual image of a light distribution pattern formed by the headlight of FIG. 3.

In the present exemplary embodiment, a cut off pattern or the corresponding shape is provided to the edge of the light emitting surface of the light guide plate 11 near the light incident surface 11a, as shown in FIG. 2. This configuration can define a luminance distribution corresponding to the light distribution pattern suitable for the low beam of a vehicle headlight.

The light from the light emitting surface 11b of the light guide plate 11 is projected toward the front illumination direction by the projection lens. Accordingly, the light source device can provide a desired low beam distribution pattern.

[Exemplary Configuration 1]

FIG. 8 shows one exemplary configuration of the vehicle headlight utilizing the above light source device 10.

Figure 8A:
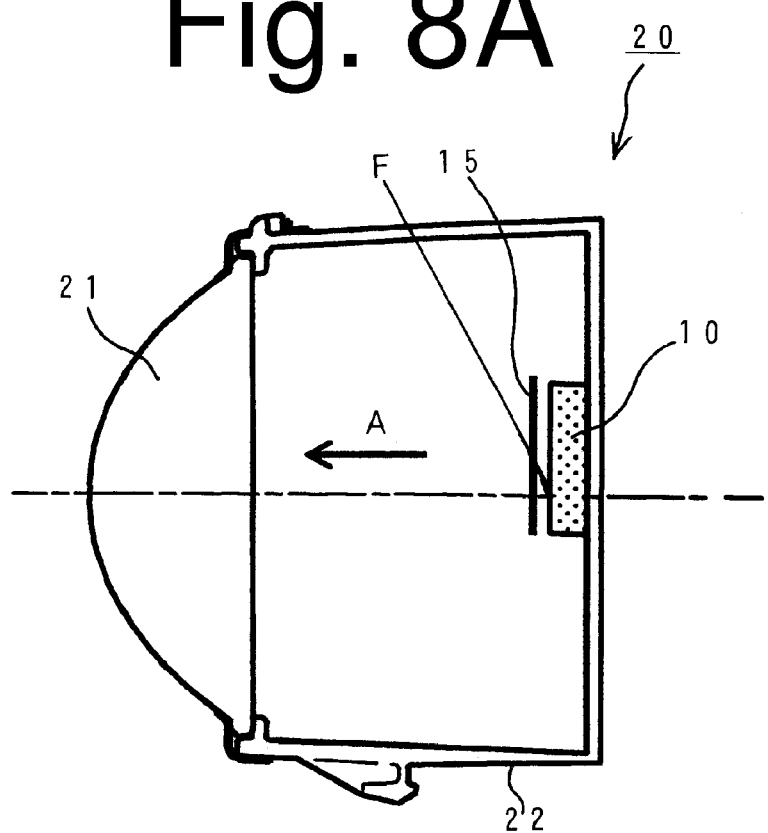
FIGS. 8A and 8B show a first exemplary configuration of a vehicle headlight utilizing the light source device of FIG. 5, FIG. 8A being a schematic cross sectional view and FIG. 8B being an illustration showing the luminance distribution of the light emitting surface of the light guide plate.

In FIG. 8A, the vehicle headlight 20 can have the light source device 10 as described above, an optical sheet 15, and a projection lens 21 for converging the light from the light source device 10.

In this exemplary configuration, the light source device 10 is located near the center of the rear end surface of the housing 22, which is opened forward. The light source device 10 as configured above can emit light toward the front illumination direction (the direction of an arrow A) through the optical sheet 15.

The projection lens 21 may be composed of a convex lens. The edge of the light guide plate 11 near the light incident surface 11a may be located substantially at the focus F of the lens at the light source device side.

Figure 8B:
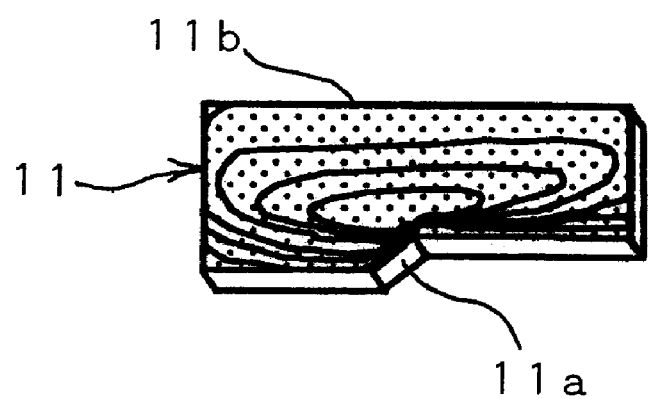

In the vehicle headlight 20 configured as described above, the respective LEDs 12 can emit light by feeding electrical power thereto. Accordingly, the light emitting surface 11b of the light guide plate 11 may emit light with a desired luminance distribution as shown in FIG. 8B. The light with the luminance distribution defined on the light emitting surface 11b of the light guide plate 11 may be projected in the front illumination direction by the projection lens 21.

In this way, the luminance distribution is enlarged and horizontally and vertically reversed, thereby forming a predetermined low beam light distribution pattern in the front illumination direction.

In this instance, the light source device 10 having the above described configuration can define the desired luminance distribution on the light emitting surface 11b of the light guide plate 11. Accordingly, there is no need to provide a reflector or any light shielding member for forming the desired light distribution pattern.

This can reduce the depth of the vehicle headlight 20 in the forward and rearward directions (along the optical axis thereof), thereby enabling the configuration of a small and light-weight vehicle headlight. Furthermore, because a light-shielding member is not required, the parts number as well as the parts cost and assembly cost can be reduced.

In the above described configuration, a cut-off pattern shape is imparted to the light emitting surface 11b of the light guide plate 11 near the light incident surface 11a. This can facilitate the provision of a high luminance distribution near the edge of the light emitting surface 11b near the light incident surface 11a. Accordingly, the boundary between the light area and the dark area near the cut-off line of the light distribution pattern formed thereby can be projected clearly with high luminance.

The LEDs 12 may be arranged at short distance between adjacent LEDs near the area where a high luminance is desired in the light distribution pattern. In this way, a desired high luminance area can easily be provided in the desired light distribution.

[Exemplary Configuration 2]

Figure 9:
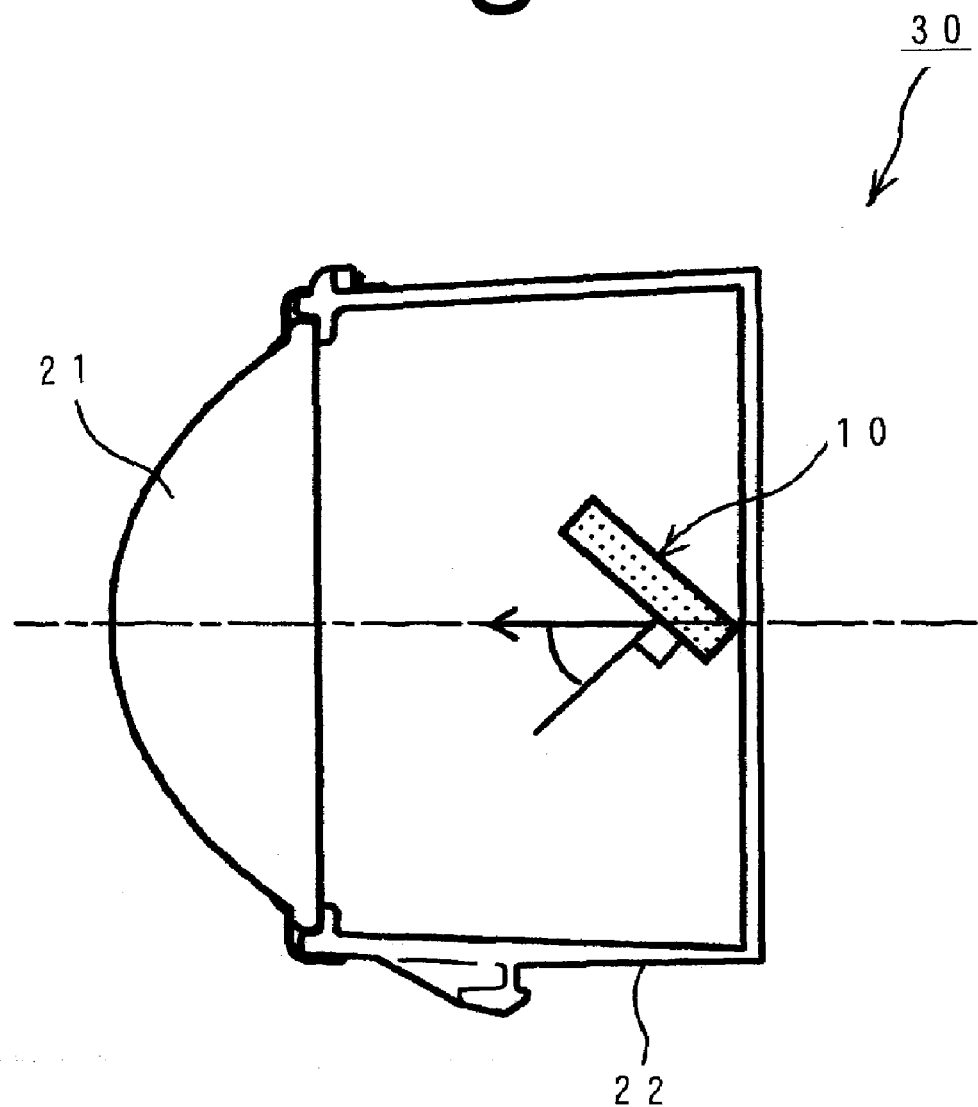
FIG. 9 is a schematic cross sectional view showing a second exemplary configuration of a vehicle headlight utilizing the light source device of FIG. 5.

FIG. 9 shows another exemplary configuration of the vehicle headlight utilizing the above described light source device 10.

In FIG. 9, the vehicle headlight 30 has the same or similar structures as compared to the vehicle headlight 20 as shown in FIG. 8, and therefore the same or similar components may be denoted with the same reference numerals and a description thereof will be omitted.

The vehicle headlight 30 has the same configuration as that of the vehicle headlight 20 except that the light emitting surface of the light source device 10 is inclined with respect to the optical axis of the projection lens 21 and in that an optical sheet 15 is not used.

In the light source device 10, the direction in which light from the luminance control element 14 is emitted from the light emitting surface 11b is inclined so that the emitted light is aligned along the optical axis of the projection lens 21.

In this case, the light source device 10 is arranged such that the cut-off line formed in the light emitting surface 11a of the light guide plate 11 is disposed substantially at the focus of the projection lens 21 and on the light source device 10 side of the lens 21.

The vehicle headlight 30 as configured above can function similar to the vehicle headlight 20 with reduced costs because an expensive optical sheet 15 is not required.

Since the light source device 10 is inclined, the light guide plate 11 may be positioned nearer the projection lens 21. Accordingly, the incident efficiency to the projection lens 21 can be improved.

Furthermore, since the light source device 10 is inclined, the occupied height within the housing 22 may be reduced. Namely, if a light source device having the same occupied height as that before is employed, the light source device 10 can have a bigger light guide plate 11. Accordingly, the resolution of the luminance control element 14 to be provided on the rear surface of the light guide plate 11 can be relatively reduced. This can reduce the manufacturing cost because a low-resolution luminance control element 14 is easier to produce.

[Exemplary Configuration 3]

Figure 10:
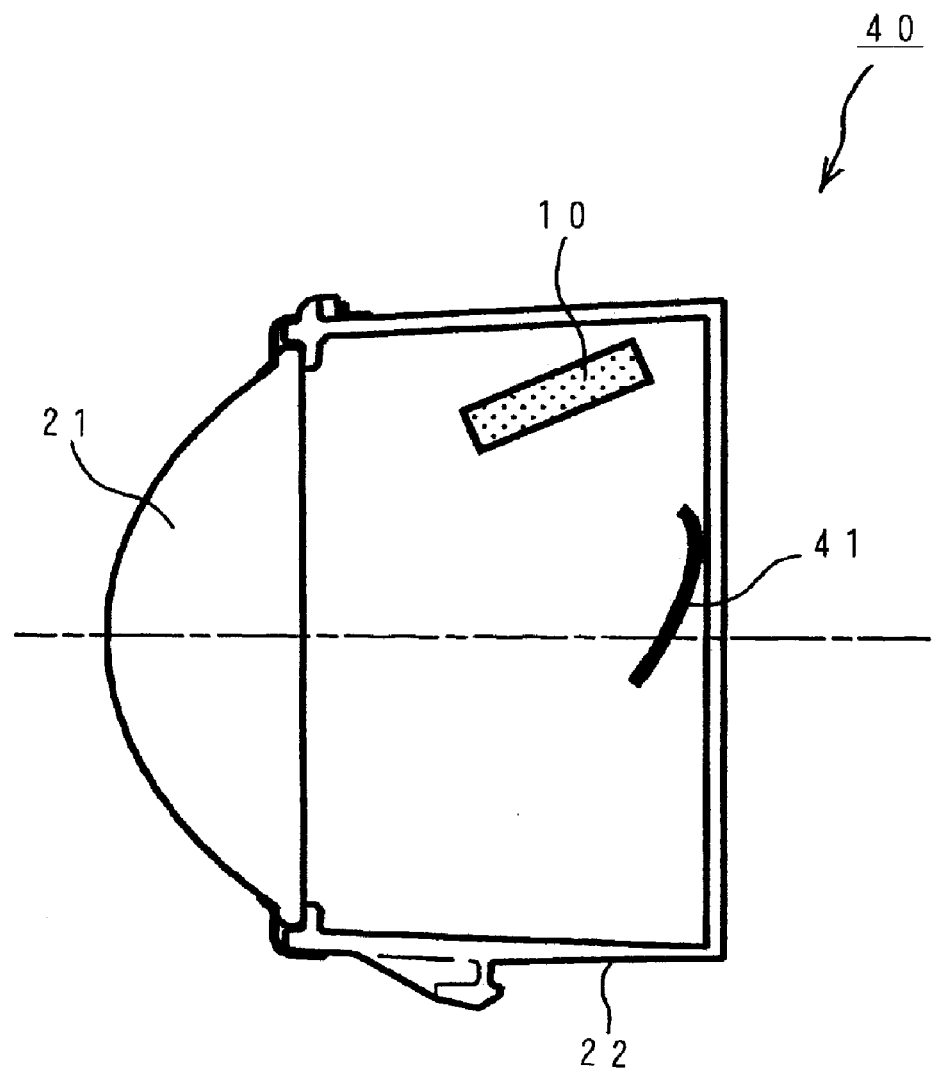
FIG. 10 is a schematic cross sectional view showing a third exemplary configuration of a vehicle headlight utilizing the light source device of FIG. 5.

FIG. 10 shows another exemplary configuration of a vehicle headlight utilizing the above described light source device 10.

In FIG. 10, the vehicle headlight 40 has the same or similar configuration as compared to the vehicle headlight 20 shown in FIG. 8, and therefore the same or similar components may be denoted with the same reference numerals, and a description thereof will be omitted.

The vehicle headlight 40 has the same configuration as that of the vehicle headlight 20 except that the light source device 10 is arranged at the upper portion of the housing 22 facing downward, and a reflector 41 is arranged near the focus of the projection lens 21.

In this exemplary configuration, the reflector 41 may be a concave mirror. Accordingly, the light emitted from the light source device 10 can be reflected by the reflector 41 to be directed forward and projected through the projection lens 21. Because of the provision of the reflector 41, the light source device can be positioned optically further away from the projection lens. Thus, the light source device can be located on or near the optical axis of the lens. However, in this case, the optical axis is considered to be bent by the reflector and directed upward to the light source device. Therefore, the light source device is positioned on a line which is obtained by bending the optical axis of the lens at the reflector to be directed upward toward the light source device. Thus, light is accurately directed from the light source device to the projection lens via the reflector.

In this vehicle headlight 40, even when a disturbance light such as sunlight enters the projection lens 21, it is not focused on or near the light source device 10. Simultaneously, a blurred image is formed near the light source device 10 by the reflector 41. This prevents the light source device 10 from being damaged due to a high intensity sunlight or other image incident thereon.

Second Exemplary Embodiment

Figure 11:
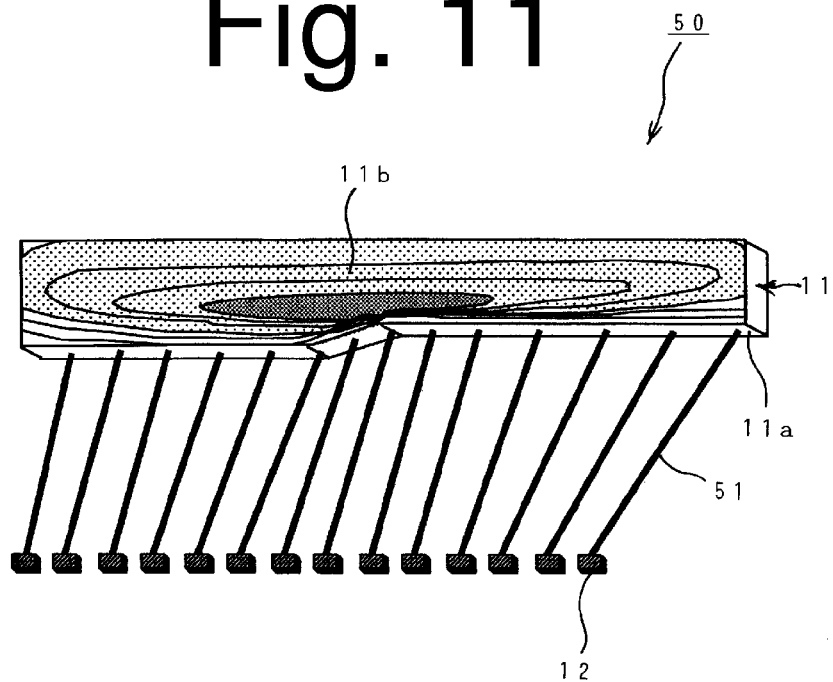
FIG. 11 is a schematic perspective view similar to that shown in FIG. 6, showing the configuration of a second exemplary embodiment of a light source device made in accordance with principles of the presently disclosed subject matter.

FIG. 11 is a diagram illustrating a light source device for use in a vehicle headlight in accordance with a second exemplary embodiment.

In FIG. 11, the light source device 50 has the same or similar structures as compared to the light source device 10 shown in FIGS. 5 through 7, and therefore the same or similar components may be denoted with the same reference numerals and a description thereof will be omitted.

The light source device 50 may have optical fibers 51 arranged between the light guide plate 11 and the respective LEDs 12. Accordingly, the LEDs 12 serving as a light source may be arranged away from the light guide plate 11. The light emitted from the respective LEDs 12 may be guided through the respective optical fibers 51 to respective predetermined positions on the light incident surface 11*a* of the light guide plate 11.

In the light source device 50 configured as described above, the LEDs 12 may be arranged away from the light guide plate 11, and in some cases, can be arranged outside the housing of the vehicle headlight. Accordingly heat generated from the LEDs 12 during operation is prevented from accumulating within the housing, and can be easily dissipated. Further, when some of the LEDs 12 may be damaged, the LEDs 12 can be easily replaced with new ones.

In the illustrated example, the LEDs 12 are provided with optical fibers one by one, but the presently disclosed subject matter is not limited thereto. For example, a bundle of optical fibers may be used to guide the light from the plurality of LEDs 12.

Third Exemplary Embodiment

Figure 12:
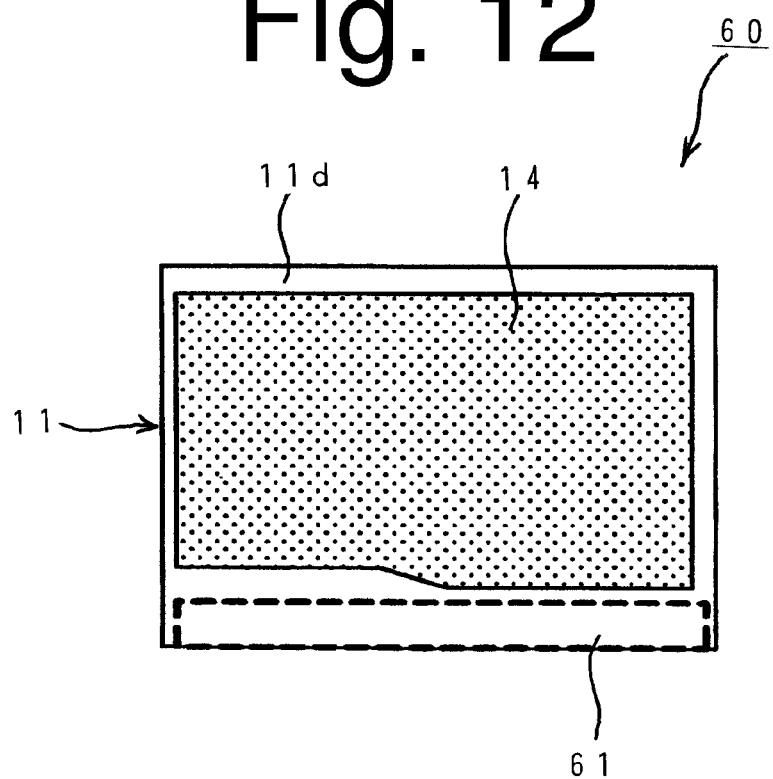
FIG. 12 is a bottom view similar to that shown in FIG. 7 of a light guide plate, showing the configuration of a third exemplary embodiment of a light source device made in accordance with principles of the presently disclosed subject matter.

FIG. 12 is a diagram illustrating a light source device for use in a vehicle headlight in accordance with a third exemplary embodiment.

In FIG. 12, the light source device 60 has some of the same or similar structures as compared to the light source device 10 shown in FIGS. 5 through 7, and therefore the same or similar components may be denoted with the same reference numerals and a description thereof will be omitted.

The light source device 60 is formed into a simple rectangle shape without forming the cut-off pattern on the light emitting surface 11*b* of the light guide plate 11, as compared to the light source device 10 as shown in FIG. 7. On the other hand, the luminance control element 14 may be formed into a shape including the cut-off pattern for the light distribution pattern.

In this case, the luminance control element 14 may be arranged a predetermined distance away from the edge of the light emitting surface side.

In general, a bright line may be generated by the direct light from the LEDs 12 near the edge of the light incident surface 11*a* of the light guide plate 11. In the present exemplary embodiment, a light shielding member 61 may be provided at an area where the luminance control element 14 is not arranged near the edge of the light emitting surface 11*b* at the light emitting surface 11*a* side in order to shield the bright light.

The light source device 60 as configured above can function in a similar manner as compared to the light source device 10 shown in FIGS. 5 through 7.

Fourth Exemplary Embodiment

Figure 13:
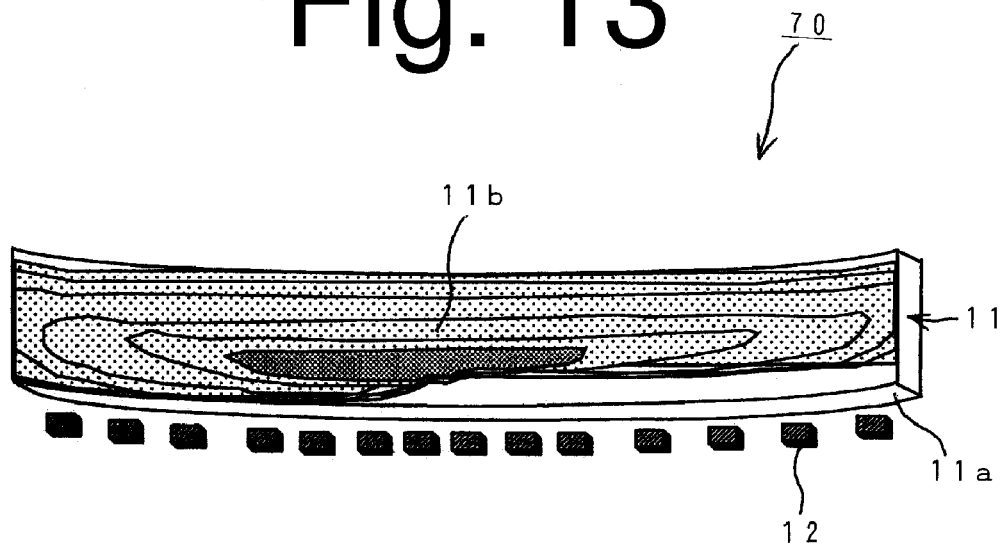
FIG. 13 is a schematic perspective view similar to that shown in FIG. 6, showing the configuration of a fourth exemplary embodiment of a light source device made in accordance with principles of the presently disclosed subject matter.

FIG. 13 is a diagram illustrating a light source device for use in a vehicle headlight in accordance with a fourth exemplary embodiment.

In FIG. 13, the light source device 70 can have portions having the same or similar structure as compared to the light source device 10 shown in FIGS. 5 through 7, and therefore the same or similar components may be denoted with the same reference numerals and a description thereof will be omitted.

The light source device 70 has a luminance control element for forming a cut-off pattern which is not obtained by the shape of the light guide plate. The entire light guide plate may be curved at both ends thereof in the longitudinal direction toward the lens 21 in order to compensate for spherical aberration of the projection lens 21 for projecting the light from the light emitting surface 11*b*. Accordingly, the light distribution pattern can be projected toward the front illumination direction by the projection lens 21 without affecting the spherical aberration of the projection lens 21.

Conversely, in view of the compensation degree of the spherical aberration by the curve of the light guide plate 11, the projection lens 21 may have a certain degree of spherical aberration which can be compensated. This allows a relatively cheaper projection lens 21 to be employed. Accordingly, the parts costs for the entire vehicle headlight may be reduced.

Fifth Exemplary Embodiment

Figure 14:
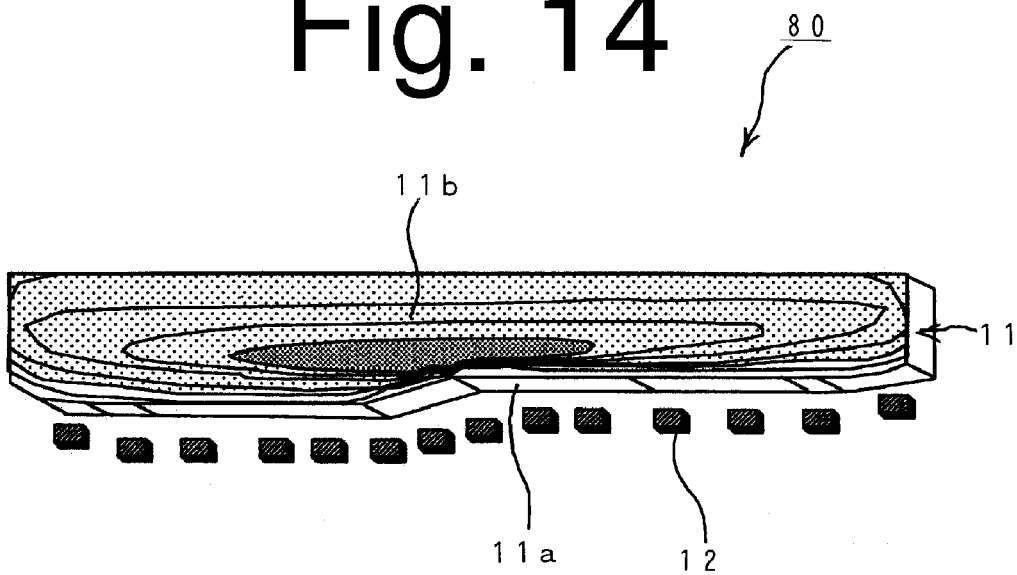
FIG. 14 is a schematic perspective view similar to that shown in FIG. 6, showing the configuration of a fifth exemplary embodiment of a light source device made in accordance with principles of the presently disclosed subject matter.

FIG. 14 is a diagram illustrating a light source device for use in a vehicle headlight in accordance with a fifth exemplary embodiment.

In FIG. 14, the light source device 80 can have portions that have the same or similar structure as compared to the light source device 10 shown in FIGS. 5 through 7, and therefore the same or similar components may be denoted with the same reference numerals and a description thereof will be omitted.

As compared with the light source device 10 of FIGS. 5 through 7, the light source device 80 is configured such that the light guide plate may be specifically designed at both ends thereof in the longitudinal direction so as to compensate for spherical aberration of the projection lens 21 and for projecting the light from the light emitting surface 11*b*.

Furthermore, both ends of the light guide plate 11 may be narrowed at lower sides of the end portions.

Furthermore, the light source device 80 configured as described above can form a cut-off pattern in the light distribution pattern to be projected toward the front illumination direction by the projection lens, as in the light source device 10 shown in FIGS. 5 through 7. Furthermore, as in the light source device 70 shown in FIG. 13, the light guide plate 11 may be formed to have narrowed end portions at both ends of the light emitting surface by gradually narrowing lower sides of the end portions corresponding to the spherical aberration of the projection lens 21. In this way, the end shapes of the light guide plate 11 can compensate for the spherical aberration of the projection lens 21.

Accordingly, the light distribution pattern can be projected toward the front illumination direction by the projection lens 21 without affecting the spherical aberration of the projection lens 21.

Conversely, in view of the compensation degree of the spherical aberration by the end shapes of the light guide plate 11, the projection lens 21 may have a certain degree of spherical aberration which can thusly be compensated. This allows a relatively cheaper projection lens 21 to be employed. Accordingly, the parts costs for the entire vehicle headlight may be reduced.

In the exemplary embodiments described above, some cases for the right-side traffic have been described, but the presently disclosed subject matter is not limited thereto, and the presently disclosed subject matter can be applied to the vehicle headlight for the left-side traffic. Off course, in this case, the arrangement of the cut-off pattern may be horizontally reversed.

In the exemplary embodiments described above, some cases utilizing a plurality of point light sources or LEDs 12 have been described, but the presently disclosed subject matter is not limited thereto, and the presently disclosed subject matter can be applied to the vehicle headlight utilizing other types of point light source, such as a semiconductor laser element. Furthermore, if the luminance control element 14 can define a desired luminance distribution on the light emitting surface 11b, other linear light sources can be used.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents. All related and conventional art references described above are hereby incorporated in their entirety by reference.

What is claimed is:

1. A vehicle lighting device, including a light source device, comprising:
    a light guide member made of a material that is transparent in a visible range, the light guide member having a front surface serving as a light emitting surface and a rear surface having a luminance control element configured to control a luminance distribution on the light emitting surface, the front surface and rear surface separated by at least one end surface;
    at least one of a point and a linear light source facing the at least one end surface of the light guide member, wherein the luminance control element is configured to control light reaching the control element from the at least one end surface of the light guide member and to configure the light into the luminance distribution of light on the light emitting surface, the luminance distribution configured to form a light distribution pattern to be projected; and
    a convex projection lens configured to project light emitted from the light source device along an optical axis of the lens and toward a front illumination direction, the lens having a focus on a side of the lens adjacent the light source device and located substantially at the light emitting surface of the light guide member of the light source device.

2. The vehicle lighting device according to claim 1, wherein the luminance control element includes a dotted or groove-shaped structure.

3. The vehicle lighting device according to claim 1, wherein the luminance control element includes at least one of a dotted pattern and a striped pattern composed of a high-reflectivity ink or coating.

4. The vehicle lighting device according to claim 1, wherein the light distribution pattern includes a cut-off area.

5. The vehicle lighting device according to claim 2, wherein the light distribution pattern includes a cut-off area.

6. The vehicle lighting device according to claim 3, wherein the light distribution pattern includes a cut-off area.

7. The vehicle lighting device according to claim 1, wherein the light emitting surface of the light guide member has a shape corresponding to a light distribution pattern including a cut-off area.

8. The vehicle lighting device according to claim 2, wherein the light emitting surface of the light guide member has a shape corresponding to a light distribution pattern including a cut-off area.

9. The vehicle lighting device according to claim 3, wherein the light emitting surface of the light guide member has a shape corresponding to a light distribution pattern including a cut-off area.

10. The vehicle lighting device according to claim 4, wherein the luminance control element includes a structure formed in a pattern including a cut-off area and the structure is spaced from the end surface of the light guide member where the light source is provided.

11. The vehicle lighting device according to claim 7, wherein the luminance control element includes a structure formed in a pattern including a cut-off area and the structure is spaced from the end surface of the light guide member where the light source is provided.

12. The vehicle lighting device according to claim 1, wherein an optical fiber is located between the light source and the light guide member and configured to guide the light emitted from the light source to the at least one end surface of the light guide member.

13. The vehicle lighting device according to claim 2, wherein an optical fiber is located between the light source and the light guide member and configured to guide the light emitted from the light source to the at least one end surface of the light guide member.

14. The vehicle lighting device according to claim 3, wherein an optical fiber is located between the light source and the light guide member and configured to guide the light emitted from the light source to the at least one end surface of the light guide member.

15. The vehicle lighting device according to claim 4, wherein an optical fiber is located between the light source and the light guide member and configured to guide the light emitted from the light source to the at least one end surface of the light guide member.

16. The vehicle lighting device according to claim 7, wherein an optical fiber is located between the light source and the light guide member and configured to guide the light emitted from the light source to the at least one end surface of the light guide member.

17. The vehicle lighting device according to claim 1, wherein the light guide member is curved at two ends thereof toward the lens in order to compensate for a spherical aberration of the projection lens.

18. The vehicle lighting device according to claim 1, wherein the light guide member includes two narrowed end portions of the light emitting surface configured with narrowing lower sides of the end portions in order to compensate for a spherical aberration of the projection lens.

19. The vehicle lighting device according to claim 1, further comprising an optical sheet located adjacent the light emitting surface of the light guide member and configured to control the light emitted from the light guide member so as to align a maximum luminous direction of the light with the optical axis of the projection lens.

20. The vehicle lighting device according to claim 1, wherein the light guide member includes at least one of a width direction and a thickness direction arranged obliquely with respect to the optical axis of the projection lens so as to align a maximum luminous direction of the light with the optical axis of the projection lens.

21. The vehicle lighting device according to claim 20, wherein a portion of the light guide member is configured to form a cut-off line and is located substantially at the focus of the projection lens on the side adjacent the light source device.

22. The vehicle lighting device according to claim 1, further comprising a reflector located substantially at the focus of the projection lens on the side adjacent the light source device and on the optical axis of the projection lens, wherein the light source device is positioned on a line which is obtained by bending the optical axis of the projection lens at the reflector.

23. The vehicle lighting device according to claim 1, wherein the luminance distribution is configured to form an asymmetric light distribution pattern, and the projection lens is configured to enlarge the light distribution pattern and configured to at least one of horizontally and vertically reverse the light distribution pattern.

24. The vehicle lighting device according to claim 1, wherein light guide member is plate shaped and the light emitting surface is substantially planar shaped.

* * * * *